United States Patent Office 3,486,963
Patented Dec. 30, 1969

3,486,963
SURFACE TREATMENT OF CRYSTALLINE GLASS CERAMIC
William E. Smith, Sylvania, Ohio, assignor to Owens-Illinois, Inc., a corporation of Ohio
No Drawing. Filed Mar. 7, 1966, Ser. No. 532,058
Int. Cl. B32b 17/06
U.S. Cl. 161—6                                    11 Claims

ABSTRACT OF THE DISCLOSURE

A process for increasing compressive stress on the surface of a glass-ceramic while increasing the smoothness of the surface wherein the glass-ceramic surface is subjected to sufficient heat, preferably by a combustion flame, to convert the glass-ceramic surface to a non-crystalline glass to a depth of from 2 to 300 microns. The glass surface can then be subjected to an ion exchange process wherein larger alkali metal ions are substituted for the smaller alkali metal ions in the surface, and the compressive stress of the surface is further increased. The coefficient of thermal expansion of the glass-ceramic is greater than the coefficient of thermal expansion of the crystallizable glass from which it is formed. A new and novel glass-ceramic having a non-crystalline surface under compressive stress is produced and the surface can have alkali metal ions therein of larger diameter than the smaller alkali metal ions originally present therein whereby the compressive stress of the surface is increased.

---

This invention relates to a process for treating articles of glass-ceramic, including glass-ceramic components of articles, to improve various physical characteristics of the glass-ceramic articles. This invention also relates to articles resulting from the treatment by the process.

E. B. Shand in his book entitled "Glass Engineering Handbook," Second edition, published in 1958 by McGraw-Hill Book Company, Inc., New York, N.Y., states on page 3 that glass has been defined as an inorganic product of fusion which has been cooled to a rigid condition without crystallization. He further states that this definition emphasizes the point that glasses are noncrystalline, i.e., amorphous. P. W. McMillan in the preface to his book entitled "Glass-Ceramics," U.S. edition, published in 1964 by Academic Press Inc., New York, N.Y., states that glass-ceramics are materials that are made by the controlled crystallization of glasses. Some inorganic glasses are not controllably crystallizable, and as a result they devitrify as the term is normally used. Those glasses that are controllably crystallizable by a heat treatment are commonly referred to as thermally crystallizable glass compositions. The glass-ceramics are the products obtained from these controllably crystallizable inorganic glasses by a suitable heat treatment, and glass-ceramics are also referred to as thermally crystallized glasses.

There are many types of silicate glasses that are thermally crystallizable glass compositions. A glass-ceramic body contains many small crystals in a glass matrix. The crystalline phase of glass-ceramics can contain one or more crystalline materials. The crystalline materials that are formed depend upon the original composition of the thermally crystallizable glass and often depend upon the nature of the heat treatment.

The expansion coefficient of thermally crystallizable glass is dependent upon the glass composition. There can be a substantial difference between the expansion coefficients of thermally crystallizable glasses that are not members of the same glass system. Also, the expansion coefficients of the glass-ceramics can differ greatly. The actual expansion coefficient of a glass-ceramic depends on the compositional ingredients and on the temperatures and times of the heat treatment used to form the glass-ceramic from the thermally crystallizable glass.

Articles of glass-ceramic material are made by melting batch ingredients to provide molten thermally crystallizable glass and thereafter forming from the molten glass by conventional means, such as press molding, casting, blow molding, and tube and rod drawing, useful glass articles which can have a high degree of surface smoothness. One type of useful article is tableware such as plates, cups, and tea pots. Tableware is usually made by pressing in a mold or by blow molding techniques. The articles of thermally crystallizable glass are subjected to a controlled heat treatment to convert the glass to a glass-ceramic. The surface smoothness of the glass article can be lost to some degree as a result of the crystals being formed during the heat treatment. The degree of roughness is dependent upon the crystal size which may be small, e.g., 0.1 micron (0.25 microinch) or large, e.g., 20 microns (50 microinches). I have found, for example, that when an article of a specific thermally crystallizable glass with a surface roughness of about ½ to 1 microinch is converted to a glass-ceramic article by controlled crystallization using a heat treatment, the article has a surface roughness of about 8 microinches as a result of the crystal formation. This illustrative glass and the glass-ceramic are the subject matter of U.S. Patent No. 3,117,881, granted to K. M. Henry and the present applicant.

Some glass-ceramics are compositions that contain one or more alkali metals, expressed as oxide as part of an overall composition also expressed primarily as oxides. Many of the thermally crystallizable glass compositions are of the lithia-alumina-silica system containing a minor amount of at least one nucleating agent for the glass, such as $ZrO_2$, $TiO_2$ and $SnO_2$. By controlled in situ crystallization there is obtained glass-ceramic that contains in a glass matrix predominantly lithia-containing crystalline phases, either beta-eucryptite or beta-eucryptite-like crystals or beta-spodumene or beta-spodumene-like crystals, or both, as indicated by X-ray diffraction data. One type of thermally crystallizable glass that forms glass-ceramic with such crystalline phases is disclosed and claimed in my copending U.S. patent application Ser. No. 352,958, filed on Mar. 18, 1964, now Patent No. 3,380,818, issued Apr. 30, 1968, and entitled "Glasses, Ceramics and Method." In his copending U.S. patent application Ser. No. 362,481, filed on Apr. 24, 1964, now U.S. Patent No. 3,428,513 and entitled "Ceramics and Method," R. R. Denman describes and claims a process in which a narrower range of my compositions of glass-ceramic are especially suitable for exchange of lithium in a surface layer of the glass-ceramic by sodium or potassium from molten salt of sodium or potassium in contact with the glass-ceramic surface. The product has a substantially greater strength than can be provided by using other glass-ceramics outside the narrower range or when using a glass-ceramic having the same type of crystals but with a different composition that is generally disclosed by U.S. Patent No. 2,920,971.

In my copending U.S. patent application Ser. No. 371,089, filed on May 28, 1964, entitled "Glass, Ceramics and Method" and hereby incorporated by reference, I disclose and claim a different type of thermally crystallizable glass, glass-ceramic, and the method of making the glass-ceramic from the thermally crystallizable glass. The thermally crystallizable glass and the glass-ceramic contain $SiO_2$, $Al_2O_3$, $Na_2O$ and $TiO_2$ as the sole essential constituents and optionally contain $K_2O$ as a fifth constituent. These constituents can be present within the following ranges on a weight basis: $SiO_2$ 44–52%, $Al_2O_3$ 22–29%, $Na_2O$ 15–22%, $TiO_2$ 6–12%, $K_2O$ 0–3%, ($SiO_2+Al_2O_3$) 69–76%, and ($Na_2O+K_2O$) 17–22%, with the weight ratio of $SiO_2$ to ($Na_2O+K_2O$) being from 2.1 to 3, and the molar ratio of ($Na_2O+K_2O$) to $Al_2O_3$ being at least 1.02. The glass-ceramic contains a multitude of substantially homogeneously dispersed crystals. Essentially all of the crystals are less than 30 microns across their largest lineal dimension. In the method an article of predetermined size and shape is formed from the thermally crystallizable glass in molten form by conventional technique and the glass is then in situ crystallized to the glass-ceramic using the heat treatment described in that patent application.

I have discovered that this thermally crystallizable glass is ion exchangeable. At least part of the sodium in its surface layer can be replaced by potassium using an immersion of the glass in molten potassium nitrate at an elevated temperature, for example, 400° C., for a sufficient period of time with a manyfold increase in flexural strength. For two illustrative glass compositions using treatment times between 8 hrs. and 64 hrs., unusually high abraded modulus of rupture above 100,000 p.s.i. were obtained. However, the glass-ceramic with the same compositions did not ion exchange using immersion at 400° C. for 64 hrs. By the ion-exchange treatment a surface layer of the glass is given a compressive stress, but there is no evidence of a compressive stress surface layer being formed by the attempted ion exchange of the glass-ceramic. The compressive stress surface layer depth ranged from about 36 microns to above 120 microns.

The ion exchange of one alkali metal for another has been described by S. S. Kistler in a paper in the Journal of the American Ceramic Society 45, No. 2 at pages 59–68, and by Research Corporation in British Patent No. 917,388. The process of Kistler and the British patent replaces at least part of one alkali metal ion in the glass at its surface layer with another alkali metal having a greater ionic diameter or radius.

U.S. Patent No. 2,779,136 of H. P. Hood and S. D. Stookey discloses an ion-exchange process in which a silicate glass containing an alkali metal oxide is contacted with a molten salt of an alkali metal having a smaller ionic diameter or radius. Specifically in the process of the Hood et al. patent, lithium replaces sodium or potassium in the glass, and the compressive stress surface layer is created in a different manner than that created by the Kistler process.

The process of U.S. Patent No. 2,779,136 relies on the substitution with the smaller alkali metal ion to provide a glass composition in the surface layer having a smaller expansion coefficient than the main body of the glass, and in that process the temperature must be above the strain point so that the glass structure can shrink somewhat because lithium ion has replaced a larger alkali metal ion.

The foregoing Kistler and Hood et al. processes use molten salts in contact with the glass to provide the ion exchange. These are salts of alkali metal and inorganic acids. H. G. Fischer and A. W. La Due disclose and claim in their copending U.S. patent application Ser. No. 504,159, filed on Oct. 23, 1965, and entitled "Process and Product" with common assignee, a method in which ion exchange of one alkali metal for another is accomplished by using a liquid medium containing an alkali metal salt of an organic acid.

E. F. Grubb and A. W. La Due in their copending U.S. patent application Ser. No. 529,215 filed Feb. 23, 1966, and entitled "Process and Product" with common assignee, discloses and claims another ion-exchange method in which the alkali metal that is to substitute for another alkali metal in the surace layer of the glass article is used as a compound that is not molten when in contact with the glass at the elevated temperature used for the ion exchange. For example, potassium carbonate as a saturated aqueous solution is applied to a surface of a hot soda-lime-silica glass article and upon evaporation of the water content a substantially continuous layer of potassium carbonate on the glass surface is obtained. The coated glass article is then maintained at an elevated temperature for the ion exchange and then the article is cooled. The potassium carbonate coating is removed at some time after the ion-exchange treating step.

In view of the methods of said Fischer et al. and Grubb et al., hereby incorporated by reference, it will be apparent that there have now been developed several different techniques for ion exchange. Each method can exchange a wide variety of glasses; thus the thermally crystallizable glasses of my said patent application Ser. No. 371,089 is not limited to molten salts of inorganic acids for ion exchange.

U.S. Patent No. 2,920,971 mentioned above describes a large number of types of glass-ceramic compositions. Many are devoid or substantially devoid of alkali metal and thus obviously would not be subject to ion-exchange treatment in which one alkali metal replaces another one in the glass.

As pointed out by McMillan on page 134 of his book, mentioned above, in a discussion of the moduli of rupture of glass-ceramics, generally speaking glass-ceramics are strong compared with ordinary glasses. For the same overall composition the strength of the glass-ceramic can be more than six times that of the glass.

It is an object of the present invention to provide a process for treating a glass-ceramic article to provide it with a compressive stress surface layer.

It is a further object of this invention to provide a process of treating a glass-ceramic article to improve its surface smoothness without a substantial decrease in its flexural strength, even with severe abrasion when the compressive stress surface layer is sufficiently thick.

Still a further object of the invention is to provide a process that will include an ion-exchange treatment, to provide by the ion exchange a compressive stress in a surface portion of an article of glass-ceramic that is not ion exchangeable.

An object of the invention is to treat the glass-ceramic to provide its surface layer with compressive stress by different treatments.

Another object is to provide the improved article resulting from the process of the present invention.

These and other objects of this invention will be apparent from the description of the invention that follows.

The process of the invention in its broadest aspect comprises (1) heating a surface layer of a glass-ceramic article to an elevated temperature sufficiently high to convert the glass-ceramic of the surface layer to a non-crystalline glass, i.e., thermally crystallizable glass, under conditions to maintain the main body portion of the article as a glass-ceramic and (2) cooling the article to obtain an article having a main body of glass-ceramic and an integral surface layer of noncrystalline glass with the surface layer being under compressive stress. The depth of the noncrystalline glass layer is ordinarily between about 2 and 300 microns and preferably at least about 50 microns. Obviously, the maximum depth will depend on various factors, including the thickness of the article and heat transfer rate. The glass-ceramic article treated by the process has a linear coefficient of expansion greater by at least 5% and preferably at least 10% than the linear coefficient of expansion of noncrystalline glass having the same overall composition as the glass-ceramic.

In the simplest embodiment of the process the surface layer of noncrystalline glass has the same overall composition as the glass-ceramic of the main body of the article, but at least a surface portion of this layer can be changed in composition by subsequent treatment, as described later in another embodiment.

The linear coefficient of expansion of the glass-ceramic is a maximum of about 200% greater than the linear coefficient of expansion of the noncrystalline thermally crystallizable glass. The maximum percentage by which the linear coefficient of expansion of the glass-ceramic may be greater than the linear coefficient of expansion of the thermally crystallizable glass of the same composition and yet be suitable for treatment of a glass-ceramic article by the process of the invention is dependent upon the linear coefficient of expansion of the thermally crystallizable glass. When the linear coefficient of expansion of the glass is relatively low the maximum difference between that expansion coefficient and the linear coefficient of expansion of the glass-ceramic can be about 200% of that value for the glass, as mentioned above. When the linear coefficient of expansion of the thermally crystallizable glass is relatively high, the linear coefficient of the glass-ceramic is a maximum of about 50% greater than that of the glass. For thermally crystallizable glasses of intermediate linear expansion coefficients the glass-ceramic should have a coefficient of expansion that does not exceed that of the glass by more than about 100%. These limitations are necessary in order to avoid too great a difference between the expansion coefficients of the glass and the glass-ceramic; otherwise, the process will result in a spalling or breaking away of the surface layer of the glass from the main body of the glass-ceramic. The foregoing limitations can be expressed alternatively in the following manner.

If the thermally crystallizable glass has a linear coefficient of expansion of about $30 \times 10^{-7}/°C.$, the glass-ceramic can have a linear coefficient of expansion that is a maximum of about 200% greater than that of the glass with a preferred maximum of about 175%. When the glass has a linear coefficient of expansion of about $50 \times 10^{-7}/°$ C., the maximum linear coefficient of expansion of the glass-ceramic is about 100% and preferably about 75% greater than that of the thermally crystallizable glass. When the glass has a linear coefficient of expansion of $80 \times 10^{-7}/°$ C. or greater, the glass-ceramic has a maximum linear coefficient of expansion that is about 50% greater than that of the thermally crystallizable glass and preferably about 40% of that of that glass.

The surface layer of the glass-ceramic article is converted to thermally crystallizable glass without conversion of the main body of the glass-ceramic by rapidly imparting thermal energy to the surface layer so that the main body or central portion of the article remains below the temperature at which the glass matrix of glass-ceramic will dissolve the crystals to produce a noncrystalline glass. Obviously, this condition is assured by limiting the time of application of thermal energy to the surface layer. The time is dependent upon the rate at which thermal energy is applied.

There are numerous ways of applying this thermal energy to the surface layer in a matter of a few seconds or a number of minutes without imparting sufficient thermal energy to the main body of the glass-ceramic so that only the surface layer is converted to the thermally crystallizable glass. One method is the directing of a combustion flame onto the surface of the glass for a limited period of time. This flame treatment is a simple way of accomplishing the conversion of the surface layer to thermally crystallizable glass without converting the main body of the glass-ceramic to thermally crystallizable glass. The depth of the thermally crystallizable glass surface layer that is formed by directing a combustion flame onto the surface of the article is dependent upon the flame temperature and upon the time of its application to the surface of the glass-ceramic body. The depth of the surface layer of thermally crystallizable glass on glass-ceramic articles that is obtained by using a particular flame temperature can vary, e.g., between 2 microns and about 300 microns. The depth depends upon the time of application of the flame to the surface of the article.

By the process of the invention articles of glass-ceramic that has the requisite relationship between its linear coefficient of expansion and that of the thermally crystallizable glass of the same overall composition are converted to articles that have flexural strengths, especially after abrasion, much greater than that of the initial articles as thermally crystallizable glass and substantially that of the initial glass-ceramic articles. As mentioned above, this overall strength is due to the surface layer of noncrystalline glass that is created under a compressive stress in combination with the strength of the main body which is glass-ceramic.

If the glass-ceramic article has a surface roughness that is greater than desired and such roughness is due to the size of the crystals in the glass-ceramic because the original article formed as glass had a satisfactory smoothness, the process of this invention, in addition to improving the strength of the article, provides a reduction in the surface roughness, i.e., provides an improved surface smoothness concomitant with the high degree of retention of the flexural strength.

There are cases where the smoothness of the surface is unimportant or where the smoothness is satisfactory because of the small size of the crystals in the glass-ceramic. The process provides a substantial flexural strength to such articles as the desired physical characteristic and any improved surface smoothness in the first case is unimportant or in the second case is very slight.

The process of the present invention would not provide a noticeable increase in strength when performed on an article of glass-ceramic that has practically the same linear coefficient of expansion as thermally crystallizable glass of the same overall composition, because a compressive stress is not created in the surface layer of thermally crystallizable glass that would be formed by the requisite thermal treatment of the surface layer only of glass-ceramic by the present process.

The process of the invention is not suitable for those glass-ceramics that have a lower linear coefficient of expansion than the thermally crystallizable glass of the same overall composition from which the glass-ceramic is made, because the process would create a surface layer of thermally crystallizable glass that is under tensile stress. The resultant product would not be as strong as the untreated glass-ceramic article. An example of a glass-ceramic that is of this type and thus is unsuitable for use with the present process is the glass-ceramic that contains as crystalline phases beta-eucryptite or beta-eucryptite-like crystals or beta-spodumene or beta-spodumene-like crystals or both, such as disclosed in my U.S. patent application Ser. No. 504,160 mentioned above. Such glass-ceramics have linear coefficients of expansion within the range for example, of about $+10$ times $10^{-7}/°$ C. to about $-10 \times 10^{-7}/°$ C. The actual values are dependent on the particular composition and on the type of heat treatment for in situ crystallization; whereas, for example, one of the thermally crystallizable glasses from which these glass-ceramics are made has a linear expansion coefficient of about $40 \times 10^{-7}/°$ C. There are many other glass-ceramics that have lower linear coefficients of expansion than that of the thermally crystallizable glasses from which they are made.

U.S. Patent No. 2,920,971 presents many compositions of glass-ceramics and thermally crystallizable glasses of substantially different compositions that have these two types of undesirable relationships between the linear expansion coefficients of the glass and the glass-ceramic. In the second type of relationship of these linear coefficients of expansion the product with a tensile stress surface layer will have a spalling or breaking away of the surface layer from the main body of the glass-ceramic article.

As used herein the specific values under the term "linear coefficient of expansion" relates to the average coefficient of expansion of the article over the temperature range of 0° C. to 300° C.

Some glass-ceramics, that have suitable linear coefficients of expansion relative to those of thermally crystallizable glass compositions from which they are made, contain a sufficient concentration of alkali metal, i.e., at least 2%, preferably at least 5% by weight, expressed as $Na_2O$, of the glass-ceramic overall composition to be exchanged by another alkali metal having a larger atomic radius but these glass-ceramics are not susceptible to such ion exchange, at least by presently known techniques, whereas the thermally crystallizable glass of the same overall composition is thus ion exchangeable. The glass-ceramic of the type disclosed and claimed in my said U.S. patent application Ser. No. 371,089 is such glass-ceramic. However, the thermally crystallizable glass of the same overall composition is ion exchangeable to replace at least part of its substantial sodium content by an alkali metal of larger atomic radius, e.g., potassium, as mentioned above and as will be seen from an example that follows.

In view of the above-described lack of exchangeability of alkali metal of certain glass-ceramics with another alkali metal of larger ionic radius, one modified embodiment of the process of the present invention is a further treatment of the article, having the integral thermally crystallizable glass surface layer with a main body of glass-ceramic at an elevated temperature with a compound of another alkali metal having a larger atomic radius than the alkali metal to be replaced, at least partially, in the thermally crystallizable glass surface layer of the article.

The article and the alkali metal compound are maintained in contact at the elevated temperature for a sufficient period of time, which may be seconds, minutes or hours depending upon the compound and the glass, to obtain the desired degree of ion exchange. The elevated temperature used for the ion exchange is a maximum of about 100° F. above the annealing point of the thermally crystallizable glass and when it is above the strain point of said glass, the glass is maintained at temperatures above the strain point less than the time for the ion-exchanged glass to relax the compressive stress created by the ion exchange. The ion exchange above the strain point with creation of compressive stress is possible, as disclosed by said U.S. patent application of E. F. Grubb and A. W. La Due.

The term "annealing point" is defined by E. B. Shand on pages 21 and 22 of his book mentioned above as the temperature at which the internal strains in glass are reduced to an acceptable limit in 15 minutes and that the glass temperature has a viscosity of $10^{13}$ poises. He states it is determined by a test (ASTM Design. C336–54T) which is made with a weighted glass fiber in a furnace cooled at a rate of 4° C. per minute. The annealing-point temperature is determined from rates of elongation of the fiber. That book on page 22 states that the term "strain point" is the temperature at which the internal stresses are reduced to low values in 4 hours. At this viscosity, which is $10^{14.5}$ poises, the glass is substantially rigid. The data for determining the strain point are obtained by using the same procedure that is used for the annealing point, but for a slower rate of fiber elongation.

The article obtained by this modified process has at least an outer part of the surface layer with a composition that differs from the overall composition of the glass-ceramic main body and from an inner portion, if any, of the compressive stress glass surface layer initially formed of the thermally crystallizable glass. The difference is primarily a lower content of the replaced alkali metal and the presence of a higher concentration of the other alkali metal ion that has a larger atomic radius in at least that outer portion of the surface layer. Of course, the glass-ceramic main body and any inner portion of the surface layer can be completely free of that alkali metal of larger atomic radius. The article resulting from this embodiment of the present invention has a greater strength than obtained by the process in which the surface layer of thermally crystallizable glass has the identical overall composition of the glass-ceramic main body because the substitution of the larger alkali metal results in a further or enhanced compressive stress in either the entire surface layer of thermally crystallizable glass or in the outer portion of that surface layer that was initially formed by the process, a described above, as the broadest embodiment of this invention.

The substitution of the larger alkali metal may result in a sufficient change in composition of the surface layer such that it is no longer thermally crystallizable glass. This may be only an outer portion of that surface layer or the noncrystalline glass layer dependent upon whether alkali metal was exchanged through the entire depth of the surface layer of thermally crystallizable glass.

When the ion exchange step is carried out at about the annealing point or above, further strength can be imparted by rapidly cooling the surface portion of the article after the ion exchange to create compressive stress by thermal tempering which per se is a well-known process.

Especially when there is a large difference between the expansion coefficients of the thermally crystallizable glass and the glass-ceramic of the same overall composition, the process is conducted by heating the entire glass-ceramic article to an elevated temperature, such as above the strain point of the thermally crystallizable glass from which it is made, before the conversion by thermal energy of the surface layer is carried out, so that spalling or cracking can be avoided.

In the modification in which there is ion exchange after converting the surface layer from glass-ceramic to thermally crystallizable glass, the ion exchange treatment is preferably carried out before cooling the article to ambient, i.e., room temperature, and when the expansion coefficients differ greatly such is mandatory in particular cases dependent, e.g., on the expansion coefficient of the thermally crystallizable glass to be ion exchanged.

The article of the invention is the product resulting from the process as described generally and the various modifications of the process.

The following examples illustrate the process in its various embodiments. In the examples one of the physical properties, that will be mentioned, is the flexural strength or modulus of rupture of thermally crystallizable glass, glass-ceramic and the product obtained by treating the glass-ceramic in accordance with one embodiment of the invention. To determine the modulus of rupture it was first necessary to make glass cane by pulling it from molten glass. The glass cane was cut into five-inch long sample rods which had a diameter of about 3/16 inch. Some of the sample rods were converted to glass-ceramic. Some of these were subsequently treated by the present process to form rods having glass-ceramic as the main body with a compressive stress surface layer of thermally crystallizable glass. The sample rods may be tested for flexural strength after or without abrasion. Most data are after abrasion of the sample rods. The abrasion of the rods comprised tumbling them for 15 minutes in a ball mill containing No. 30 silicon carbide grit.

The flexural strengths were determined using a Tinius-Olson testing machine. This machine applies a measured load through a single knife edge to the center of the sample rod supported on two knife edges that are four inches apart (3-point loading). The load is applied at a constant rate of 24 lbs. per min. until failure occurs with a marker indicating the highest load applied to the point of failure. A dial micrometer calibrated in inches and equipped with a bar contact instead of a point contact was used to measure the maximum and minimum diameters at the center of the sample to an accuracy of 0.0005 inch. Since few sample rods are perfectly round, the load is applied normal to the maximum diameter and the standard formula for an elliptical cross-section is used in calculating the modulus of rupture (MR) as follows:

$$MR = \frac{(10.185) \times \text{Load}}{D_1^2 \times D_2}$$

The modulus of rupture in this formula gives the flexural strength in pounds per square inch of cross-sectional area at failure.

EXAMPLE I

Sample rods were made from glass cane by cutting as described above. The glass cane was made from molten glass having the following theoretical composition, expressed as oxides on a weight percent basis:

| | |
|---|---|
| $SiO_2$ | 48 |
| $Al_2O_3$ | 26 |
| $Na_2O$ | 18 |
| $TiO_2$ | 8 |

This glass has a liquidus temperature of 2215° F. and a log 4 viscosity of 2210° F. It has an average linear coefficient of expansion (0° C.–300° C.) of $90 \times 10^{-7}$/° C. This glass is an example of the type disclosed and claimed in my said copending U.S. patent application Ser. No. 371,089 mentioned above. The manufacture of such glass and illustrative batch materials are described in that patent application.

As described in that patent application, the glass can be converted to glass-ceramic by suitable heat treatment. The schedule of heat treatment can vary. A typical heat treatment is as follows. Rods are placed in a furnace and heated in accordance with the following schedule:

| ° F.: | Hours |
|---|---|
| 1350 | 2 |
| 1450 | 1 |
| 1500 | 1 |
| 1800 | 1 |

The rods are then slowly cooled in the furnace by simply shutting off the electric power to the heating elements. By the foregoing treatment, rods of glass-ceramic of this composition were prepared from rods of the thermally crystallizable glass. The average linear coefficient of expansion (0° C. to 300° C.) of the glass-ceramic was about $100 \times 10^{-7}$/° C. to $120 \times 10^{-7}$/° C.

Sample rods of the glass-ceramic were found to have a modulus of rupture, after abrasion as described above, of 20,000 p.s.i., whereas unabraded rods had a modulus of rupture of more than 30,000 p.s.i. Sample rods of the thermally crystallizable glass, without abrasion, would be expected in view of other data to have an average modulus of rupture of about 10,000 p.s.i. and a slightly lower value for such rods after such abrasion.

Sample rods of this thermally crystallizable glass and sample rods of the glass-ceramic were immersed in molten potassium nitrate for various periods of time. The rods were then removed from the molten salt and cooled slowly to room temperature to avoid the creation of thermal stress. Next the samples were washed with water to remove the potassium nitrate coating. Some rods of different times of treatment were examined by well-known techniques to determine the depth and type and amount of stress for the surface layers. Other sample rods were tested for modulus of rupture, after their abrasion with silicon carbide grit as described above.

The rods of the glass-ceramic were immersed in molten potassium nitrate maintained at 340° C. and 400° C. for 5 hours and 64 hours, respectively. Neither of these potassium nitrate immersion treatments produced any stress in the rods and thus, of course, there was no stress layer. The moduli of rupture of the subsequently-abraded rods were 13,000 p.s.i. and 14,000 p.s.i., respectively. These data show that the glass-ceramic of this type is not ion exchanged to replace sodium with potassium in a glass-ceramic surface layer of the glass-ceramic article.

The sample rods of the thermally crystallizable glass, were immersed in a bath of molten potassium nitrate maintained at 400° C. for different periods of time, namely, 4, 8, 16, 24, 32 and 64 hours. For all six time periods of ion-exchange treatment the rods were found to have a compressive stress surface layer. The depth of this layer after 4, 8, 24 and 64 hours of treatment was 36+, 45, 63 and 100 microns, respectively. For sample rods after 4, 8, 24 and 64 hours of immersion, followed by the abrasion described above, had modulus of rupture of 22,000 p.s.i., 63,000 p.s.i., 125,000 p.s.i. and 114,000 p.s.i., respectively. The lower flexural strength after 64 hours of treatment as compared with 24 hours of treatment is not unexpected. It is well known in the art of ion exchange of glasses that if the process can be conducted for too long a period of time, in which case ion exchange will start to occur in the main body of the glass by diffusion etc., and this will start a decrease of compressive stress in the surface layer.

Sample rods of glass-ceramic can be removed from the furnace when the heat to furnace is shut down and the rods are fire polished by directing on their surface the flame of a Meeker burner for a short period of time to convert a surface layer of the glass-ceramic to the thermally crystallizable glass and then returned to the furnace for cooling. This surface layer can be about 200 microns in thickness. This was simulated by preheating rods of the glass-ceramic to an elevated temperature followed by the flame treatment and then slowly cooling the rods. The flame-treated rods had a glass surface layer with a compressive stress.

Because of the high expansion coefficient of the thermally crystallizable glass, crazing occurred at the surface layer when rods of the glass-ceramic at room temperature were flame treated, even though the difference between the glass and glass-ceramic was relatively small.

In view of the foregoing data of this example, it is apparent that the glass-ceramic rods, after the flame treatment to form a thermally crystallizable glass surface layer, can be given a very substantial increase in flexural strength by the creation of additional compressive stress in the surface layer. It is also apparent that when the surface layer of the thermally crystallizable glass is formed from the glass-ceramic by the process of the invention to a substantial depth, for example, 200 microns or greater that the subsequent ion exchange illustrated by this example will provide an additional compressive stress at the outer portion of the glass surface layer. Of course, if by the process of the present invention the glass-ceramic article has its surface layer converted to thermally crystallizable glass of a depth equal to or less than the thickness that is ion exchangeable in a specific ion-exchange treatment, the entire depth of the thermally crystallizable glass surface layer would be ion exchanged by the ion-exchange treatment but the glass-ceramic main body would not be ion exchanged, as seen above by its lack of ion exchangeability.

At least many of the glasses that are of the type disclosed and claimed in my said U.S. patent application Ser. No. 371,089 have a suitable relationship between the expansion coefficient of the thermally crystallizable glass and that of the glass-ceramic to be useful in the process of the present invention and thus by the process produce the article of the present invention.

EXAMPLE II

Sample rods were made from glass cane pulled from molten glass having the following theoretical composition, expressed as oxides or fluoride on a weight percent basis:

| | Percent |
|---|---|
| $SiO_2$ | 47.6 |
| $Al_2O_3$ | 31.3 |
| $MgO$ | 11.1 |
| $LiF$ | 1.0 |
| $ZrO_2$ | 7.0 |
| $TiO_2$ | 1.8 |
| Fining agent | 0.2 |

This glass is an example of the type of thermally crystallizable glass described and claimed in said U.S. Patent No. 3,117,881 which also describes illustrative batch materials for the glass and its manufacture. The fining agent was tin oxide and thus the foregoing composition of the sample rods is Example 31 of that patent.

This type of glass-ceramic has an overall composition on a weight range basis consisting essentially of: $SiO_2$ 40–70%, $Al_2O_3$ 15–35%, MgO 5–15% and $ZrO_2$ at least 6% and a secondary nucleant selected from the group consisting of $TiO_2$, $MoO_3$, $Fe_2O_3$, $V_2O_5$, CoO, NiO, and $ThO_2$ in an amount less than 2 percent, the sum of the $ZrO_2$ and said secondary nucleant being at least 7.5 percent of the composition.

An article of this glass having illustratively a surface smoothnes of one microinch was converted to a glass-ceramic article with a surface smoothness of eight microinches. The average linear coefficient of expansion of this glass and a typical glass-ceramic made from it by suitable heat treatment as described in U.S. Patent No. 3,117,881 are $34 \times 10^{-7}/°$ C. and $90 \times 10^{-7}/°$ C., respectively.

Sample rods of this thermally crystallizable glass were abraded by silicon carbide grit as described earlier. Other sample rods were converted to glass-ceramic by heat treatment in accordance with the method described in said patent and some of these were tested, after abrasion with silicon carbide grit as described earlier, for modulus of rupture. Other sample rods of the glass-ceramic were flame treated as described in Example I to produce rods with a surface layer of thermally crystallizable glass to a depth of about 200 microns and with a surface smoothness of about ¾ microinch. These fire-polished, glass-ceramic rods had a compressive stress surface layer due to the formation of the thermally crystallizable glass in the surface layer by the combustion flame treatment. These rods were also tested for modulus of rupture after the silicon carbide grit abrasion.

The flexural strengths or moduli of rupture of the abraded sample rods of glass, glass-ceramic and glass-ceramic with the thermally crystallizable glass surface layer were 15,000 p.s.i., 100,000 p.s.i. and 70,000 p.s.i., respectively.

Most of the compositions of the type disclosed and claimed in U.S. Patent No. 3,117,881 meet the requisite relationship between that compositon as thermally crystallizable glass and that compositon as glass-ceramic to be suitable for use in the process of the present invention and thus to make the article resulting from that process.

As mentioned earlier, there are numerous compositions of glass-ceramics that have expansion coefficients as compared with the expansion coefficients of thermally crystallizable glass from which they can be made to be suitable for use in the present process and to prepare the article of the present invention. For example, there are two compositions disclosed on page 99 of P. W. McMillan's book mentioned above that meet this relationship requirement. One composition on a weight basis contains 81% $SiO_2$, 4% $Al_2O_3$, 12.5% $Li_2O$ and 2.5% $K_2O$. Its expansion coefficient (20–400° C.) as a glass is about $84 \times 10^{-7}/°$ C. and as a glass-ceramic is $113 \times 10^{-7}/°$ C. The other composition on a weight basis contains 62.1% $SiO_2$, 18.4% $Al_2O_3$, 1.9% $Li_2O$ and 17.6% MgO with its corresponding expansion coefficient of about $42 \times 10^{-7}/°$ C. as glass and about $50 \times 10^{-7}/°$ C. as glass-ceramic. McMillan indicates that these compositions also contain a small proportion of $P_2O_5$ which acts as a nucleation catalyst. Articles of these glass-ceramics with a compressive stress surface layer of the corresponding thermally crystallizable glass would be ion exchanged by molten salts of any alkali metal other than lithium (because lithia is either the predominant or the only alkali metal oxide in the glass), preferably by ion exchange using sodium or potassium salt.

U.S. Patent No. 2,920,971 describes three compositions expressed on a weight basis as oxides that have the requisite relationship between the expansion coefficient of the composition as a glass and as a glass-ceramic. The first composition contains 56% $SiO_2$, 20% $Al_2O_3$, 15% MgO and 9% $TiO_2$ with expansion coefficients of about $38 \times 10^{-7}/°$ C. as glass and $56 \times 10^{-7}/°$ C. as glass-ceramic. The second composition contains 43.8% $SiO_2$, 13.2% $Al_2O_3$, 12.3% $TiO_2$ and 30.7% BaO with expansion coefficients of about $56 \times 10^{-7}/°$ C. as glass and about $92 \times 10^{-7}/°$ C. as glass-ceramic. The third composition contains 38.4% $SiO_2$, 17.8% $Al_2O_3$, 11.1% $TiO_2$ and 32.7% PbO, with expansion coefficients of about $42 \times 10^{-7}/°$ C. and about $59 \times 10^{-7}/°$ C. as glass-ceramic. It is noted that these three compositions of glass-ceramic do not contain alkali metal oxide, except as unannounced minor impurities. Thus they would not be suitable for an alkali metal ion-exchange treatment after the conversion of the surface layer of the glass-ceramic article to thermally crystallizable glass.

British Patent No. 869,328 presents at least three examples of glass-ceramic and thermally crystallizable glasses of the same composition that have expressly indicated expansion coefficients such that they should be suitable for use in the present invention. These compositions as thermally crystallizable glass have average expansion coefficients (0° C. to 300° C.) of about $80 \times 10^{-7}/°$ C., $95 \times 10^{-7}/°$ C. and $84 \times 10^{-7}/°$ C., respectively, and as glass-ceramics are $109 \times 10^{-7}/°$ C., $120 \times 10^{-7}/°$ C. and $107 \times 10^{-7}/°$ C., respectively. It is expected that many other compositions of this type would be suitable. These compositions, herein designated A, B and C, have on a mole percent basis the following ingredients:

|  | A | B | C |
|---|---|---|---|
| $SiO_2$ | 63.1 | 57.4 | 57.2 |
| $Al_2O_3$ | 20.3 | 21.3 | 21.2 |
| $Na_2O$ | 16.6 | 21.3 | 18.1 |
| CaO |  |  | 3.5 |
| MgO * |  | 4.0 | 4.0 |
| $TiO_2$ * | 7.8 | 8.7 | 8.7 |
| CoO * | 2.3 |  |  |

*Mole percent in excess of base composition and used as nucleant mixture.

Because these compositions contain substantial amounts of sodium expressed as soda, the thermally crystallizable glass surface layer integral with the glass-ceramic main body would be ion exchanged by replacing sodium with potassium or other larger alkali metal ion.

The foregoing examples of ion exchange with reference to one embodiment of the invention used an elevated temperature that was 400° C. The elevated temperature for ion exchange is at least about 200° C. and usually at least about 300° C. and preferably at least about 350° C.

In one other embodiment of the invention, instead of converting the surface layer of the glass-ceramic throughout the entire area of the article to thermally crystallizable glass to provide somewhat a uniform compressive stress over the entire area of the article, the article is heated in at least one predetermined area on the article to convert the surface layer in that area only to noncrystalline glass. This is accomplished in a manner to provide a graduation in depth of conversion of glass-ceramic to thermally crystallizable glass so that the thickness of the thermally crystallizable glass layer decreases from a central part of the area toward the periphery of that area.

I claim:
1. A process for treating an article of a glass-ceramic formed by in situ crystallization of a thermally crystallizable $SiO_2$–$Al_2O_3$-containing glass composition, which process comprises:
   (1) heating at least an area of a surface layer of the glass-ceramic article to an elevated temperature sufficiently high to convert the glass-ceramic in said area of the surface layer to an amorphous glass under conditions to maintain the main body of the article as a glass-ceramic; and
   (2) cooling the article, whereby there is obtained an article with said area of the surface layer being amorphous glass and with the main body being glass-ceramic and the article having a compressive stress surface layer at said area, said glass-ceramic having a linear coefficient of expansion at least 5% and a maximum of about 200% greater than the linear coefficient of expansion of amorphous glass having the same overall composition as the glass-ceramic.

2. The process of claim 1 wherein the entire area of the glass-ceramic article is heated to convert said surface layer to the amorphous glass of essentially the same overall composition, said heating maintained until said surface layer of amorphous glass reaches a depth of from 2 to 300 microns.

3. The process of claim 2 wherein the overall composition of said glass-ceramic consists essentially of the following ranges of constituents on a weight basis: $SiO_2$ 44–52%, $Al_2O_3$ 22–29%, $Na_2O$ 15–22%, $TiO_2$ 6–12%, $K_2O$ 0–3%, $(SiO_2+Al_2O_3)$ 69–76%, and $(Na_2O+K_2O)$ 17–22%, with the weight ratio of $SiO_2$ to $(Na_2O+K_2O)$ being from 2.1 to 3, and the molar ratio of $(Na_2O+K_2O)$ to $Al_2O_3$ being at least 1.02, and the coefficient of linear expansion of the glass-ceramic is at least 10% greater than the coefficient of linear expansion of said amorphous glass having the same overall composition as the glass-ceramic.

4. The process of claim 2 wherein the heat applied to the article to convert the surface layer of the glass-ceramic to amorphous glass is a combustion flame.

5. The process of claim 1 wherein the glass-ceramic has an overall composition on a weight range basis: $SiO_2$ 40–70%, $Al_2O_3$ 15–35%, MgO 5–15% and $ZrO_2$ at least 6% and a secondary nucleant selected from the group consisting of $TiO_2$, $MoO_3$, $Fe_2O_3$, $V_2O_5$, CoO, NiO, and $ThO_2$ in an amount less than 2%, the sum of the $ZrO_2$ and said secondary nucleant being at least 7.5% of the composition.

6. A process for treating an article of a glass-ceramic formed by in situ crystallization of a thermally crystallizable $SiO_2$–$Al_2O_3$-containing glass composition further containing in its overall composition an alkali metal content of at least 2% by weight expressed as $Na_2O$ which comprises:
   (1) heating at least an area of a surface layer of the glass-ceramic article to an elevated temperature sufficiently high to convert the glass-ceramic in said area of the surface layer to an amorphous glass under conditions to maintain the main body of the article as a glass-ceramic;
   (2) treating said area of the surface layer of amorphous glass by contact with a salt of an alkali metal, having as an ion a larger atomic radius than an ion of said alkali metal in said glass-ceramic, at an elevated temperature and for a period of time sufficient to provide by exchange between said alkali metal ions of said salt and said amorphous glass a compressive stress in at least an outer portion of said surface layer and for a time insufficient to provide substantial stress relaxation in said surface layer;
   (3) removing the article from contact with said salt of alkali metal; and
   (4) cooling the article,
whereby there is obtained an article with said area of the surface layer being amorphous glass and with the main body being glass-ceramic and with the article having a compressive stress surface layer at said area, said glass-ceramic having a linear coefficient of expansion at least 5% and a maximum of about 200% greater than the linear coefficient of expansion of amorphous glass having the same overall composition as the glass-ceramic.

7. The process of claim 6 wherein the overall composition of said glass-ceramic consists essentially of the following ranges of constituents on the weight basis: $SiO_2$ 44–52%, $Al_2O_3$ 22–29%, $Na_2O$ 15–22%, $TiO_2$ 6–12%, $K_2O$ 0–3%, $(SiO_2+Al_2O_3)$ 69–76%, and $(Na_2O+K_2O)$ 17–22%, with the weight ratio of $SiO_2$ to $(Na_2O+K_2O)$ being from 2.1 to 3, and the molar ratio of $(Na_2O+K_2O)$ to $Al_2O_3$ being at least 1.02.

8. The process of claim 6 wherein the heat applied to the article to convert the surface layer of the glass-ceramic to noncrystalline glass is a combustion flame, wherein the ion exchange with the salt of alkali metal ion in said surface layer is to a depth of 2 to 300 microns.

9. The process of claim 8 wherein the depth of said ion exchange is less than the depth of said noncrystalline glass layer.

10. The article made in accordance with the method defined in claim 1.

11. The article made in accordance with the method defined in claim 6.

References Cited

UNITED STATES PATENTS

| | | | |
|---|---|---|---|
| 3,282,711 | 11/1966 | Lin | 65—33 XR |
| 3,275,493 | 9/1966 | MacDowell | 65—33 XR |
| 3,282,770 | 11/1966 | Stookey et al. | 65—30 XR |
| 3,287,201 | 11/1966 | Chisholm et al. | 65—30 XR |

FOREIGN PATENTS

| | | |
|---|---|---|
| 1,411,300 | 8/1965 | France. |
| 1,012,367 | 12/1965 | Great Britain. |
| 1,026,770 | 4/1966 | Great Britain. |

FRANK W. MIGA, Primary Examiner

U.S. Cl. X.R.

65—30, 33, 111, 117, 120; 106—39, 52; 161—192